US009646497B1

(12) United States Patent
Chatham (10) Patent No.: US 9,646,497 B1
(45) Date of Patent: May 9, 2017

(54) SYSTEM AND METHOD FOR DETERMINING POSITION AND DISTANCE OF OBJECTS USING ROAD FIDUCIALS

(71) Applicant: Google Inc., Mountain View, CA (US)

(72) Inventor: Andrew Hughes Chatham, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/928,444

(22) Filed: Oct. 30, 2015

Related U.S. Application Data (63) Continuation of application No. 14/508,269, filed on Oct. 7, 2014, now Pat. No. 9,207,679, which is a continuation of application No. 13/742,745, filed on Jan. 16, 2013, now Pat. No. 8,880,273.

(51) Int. Cl.
| | | |
|---|---|---|
| G05D 1/00 | (2006.01) | |
| G05D 1/02 | (2006.01) | |
| B60W 30/08 | (2012.01) | |
| G08G 1/16 | (2006.01) | |

(52) U.S. Cl.
CPC ........... *G08G 1/166* (2013.01); *G05D 1/0088* (2013.01)

(58) Field of Classification Search
CPC ............. G06K 9/00798; G05D 1/0246; G05D 1/0234; G05D 2201/0213; B60W 30/08; B60W 30/00; G08G 1/00; G08G 1/166; G08G 1/167
USPC .......... 701/28, 466; 340/933, 937, 903, 435, 340/437
See application file for complete search history.

(56) References Cited

U.S. PATENT DOCUMENTS

| | | | | |
|---|---|---|---|---|
| 6,122,573 A | * | 9/2000 | Higashi | G05D 1/0261 180/167 |
| 6,470,265 B1 | * | 10/2002 | Tanaka | G01C 11/00 701/532 |
| 6,813,370 B1 | | 11/2004 | Arai | |
| 7,522,091 B2 | | 4/2009 | Cong et al. | |
| 2003/0195704 A1 | | 10/2003 | Sekiguchi | |
| 2005/0107931 A1 | | 5/2005 | Shimakage et al. | |
| 2008/0040029 A1 | * | 2/2008 | Breed | B60N 2/2863 701/514 |
| 2008/0174453 A1 | * | 7/2008 | Schofield | B60Q 1/346 340/933 |
| 2010/0082195 A1 | | 4/2010 | Lee et al. | |
| 2010/0088024 A1 | | 4/2010 | Takahara et al. | |
| 2011/0093179 A1 | | 4/2011 | Schofield et al. | |
| 2011/0144907 A1 | | 6/2011 | Ishikawa et al. | |
| 2011/0288774 A1 | | 11/2011 | Bengtsson et al. | |
| 2012/0033074 A1 | | 2/2012 | Spangenberg | |
| 2012/0314070 A1 | | 12/2012 | Zhang et al. | |

(Continued)

FOREIGN PATENT DOCUMENTS

JP        406034743 A        2/1994

*Primary Examiner* — Marthe Marc-Coleman
(74) *Attorney, Agent, or Firm* — Lerner, David, Littenberg, Krumholz & Mentlik, LLP (57) ABSTRACT

Aspects of the invention relate generally to autonomous vehicles. The features described improve the safety, use, driver experience, and performance of these vehicles by using ground markers to determine the position of the surrounding objects. In particular, the autonomous vehicle is capable of detecting nearby objects, such as vehicles and pedestrians, and is able to determine the position of these objects based on whether they have passed over ground markers.

20 Claims, 10 Drawing Sheets

(56) References Cited

U.S. PATENT DOCUMENTS

2013/0253753 A1 9/2013 Burnette et al.
2013/0314503 A1 11/2013 Nix et al.

\* cited by examiner

SYSTEM AND METHOD FOR DETERMINING POSITION AND DISTANCE OF OBJECTS USING ROAD FIDUCIALS

CROSS-REFERENCE TO RELATED APPLICATIONS

The present application is a continuation of U.S. patent application Ser. No. 14/508,269, filed Oct. 7, 2014, which is a continuation of U.S. patent application Ser. No. 13/742,745, filed Jan. 16, 2013, now U.S. Pat. No. 8,880,273, the disclosures of which are incorporated herein by reference.

BACKGROUND

Autonomous vehicles use various computing systems to aid in the transport passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

BRIEF SUMMARY

In controlling an autonomous vehicle, it is important to accurately determine the position of surrounding objects, including other vehicles. In some cases, it may be difficult to get an accurately determine the proximity of another vehicle. In accordance with one aspect of the disclosure, ground markers are placed along traffic lanes, so as to allow the distance to other vehicles may be more accurately determined. These ground markers may be symbols that are painted on the road or any other visible attribute of the road itself. The location of each ground marker may be stored in a database that is accessible to an autonomous vehicle.

The autonomous vehicle may have one or more sensors (e.g., cameras, radar, laser range finders) for capturing information relating to the environment in which the vehicle is operating. The processor receives data from the sensors and, based in part on data from the sensors or received from external sources or both, issues a navigation command, where a navigation command comprises a command to the steering device relating to the intended direction of the vehicle (e.g., a command to turn the front wheels of a car 10 degrees to the left) or to the engine relating to the intended velocity of the vehicle (e.g., a command to accelerate). Navigation commands may also include commands to brakes to slow the vehicle down, as well as other commands affecting the movement of the vehicle.

In accordance with one aspect, the autonomous vehicle detects a nearby vehicle and detects a ground marker using the one or more sensors. The autonomous vehicle may determine that nearby vehicle has caused a change in the visibility of the ground marker, due to the nearby vehicle passing over the ground marker. The autonomous vehicle may then determine the position of the nearby vehicle by accessing a database that contains position data for the ground marker. The processor may then control the autonomous vehicle in accordance with a control strategy that is based on the nearby vehicle's determined position.

In another aspect, the nearby vehicle may instead be a pedestrian or bicycle. In addition, the shape, color, or size of the ground markers may vary from one another and may be identified in the accessed database. The autonomous vehicle may in turn use the shape, color, or size of a detected ground marker to associate it with the appropriate database entry.

In yet another aspect, the autonomous vehicle may determine its geographic position and identify the nearby vehicle's proximity to the autonomous vehicle. The determining of the geographic position of the autonomous vehicle may be based, at least in part, on the position data of the ground marker.

In still another aspect, autonomous navigation may be based on detecting a plurality of objects and a plurality of ground markers using one or more detecting devices, wherein the ground markers are located along traffic lanes. The processor of the autonomous vehicle then accesses a database containing location data for a set of ground markers, and associates each of the detected ground markers with one of the ground markers from the set of ground markers. The autonomous vehicle may then determine that a first vehicle from the plurality of detected objects has passed over a first ground marker, and that a second vehicle has passed over a second ground marker. This determination being based on a change in visibility of the first and second ground markers.

The autonomous vehicle may then determine the location of the first and second vehicles based on the location data that has been associated with the first and second ground markers, respectively. The autonomous vehicle may then be controlled in accordance with a control strategy based on the determined location of the first and second vehicles. The autonomous vehicle may then store the determined location of the first and second vehicles in a memory.

In another aspect, the accessed database includes a map containing the set of ground markers.

DETAILED DESCRIPTION

Aspects of the disclosure relate generally to determining the position of surrounding objects using road fiducials or ground markers. A vehicle implementing the autonomous driving system is capable of detecting and reacting to surrounding objects. Some of the detected objects will be mobile, such as pedestrians, automobiles, and bicycles. The autonomous driving system is operable to identify these surrounding objects and track their movements. As set forth below, autonomous driving system may use the visibility of the ground markers to determine when one or more of the surrounding objects have passed the ground marker. The system may then access a database containing the location of each ground marker, thereby allowing the vehicle to determine the distance to the surrounding vehicles.

Figure 1:
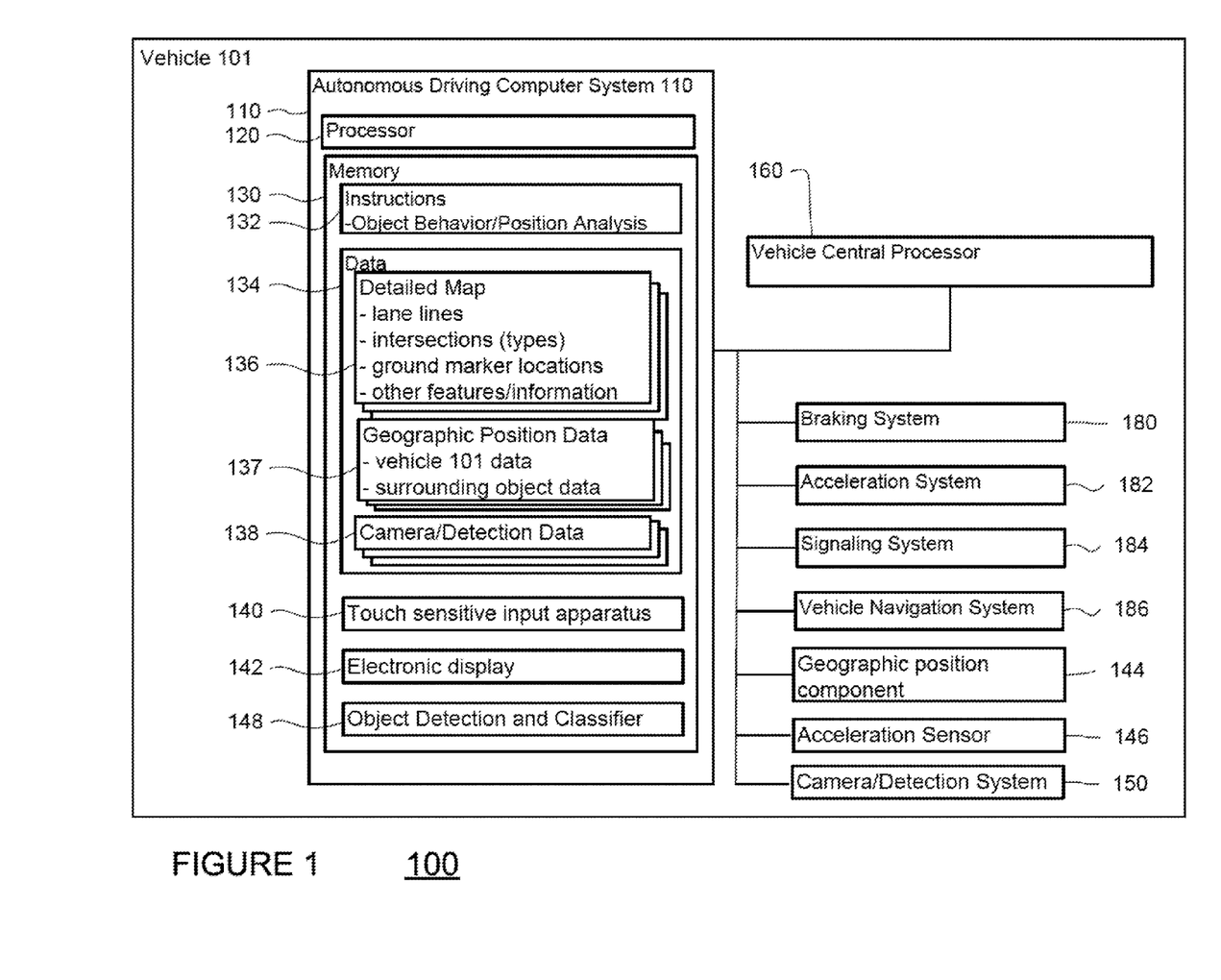
FIG. 1 is a functional diagram of an autonomous navigation system in accordance with an aspect of the disclosure.

As shown in FIG. 1, an autonomous driving system 100 in accordance with one aspect of the invention includes a vehicle 101 with various components. While certain aspects of the invention are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited to any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional multi-purpose processor or may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components such as steering components and deceleration components may each have their own processor that only performs calculations related to the component's specific function.

In various aspects described herein, the processor may be located in a remote position relative to the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer, such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input (e.g., a mouse, keyboard, touch screen and/or microphone), as well as various sensors (e.g. a video camera) for gathering the explicit (e.g. a gesture) or implicit (e.g. "the person is asleep") information about the states and desires of a person.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The device may also include other features in communication with computer 110, such as an accelerometer, gyroscope or another direction/speed detection device 146 to determine the direction and speed of the vehicle or changes thereto. By way of example only, acceleration sensor 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels). Computer 110 may also access camera or other detection data 138 that has been obtained through the detection system 150.

Figure 2:
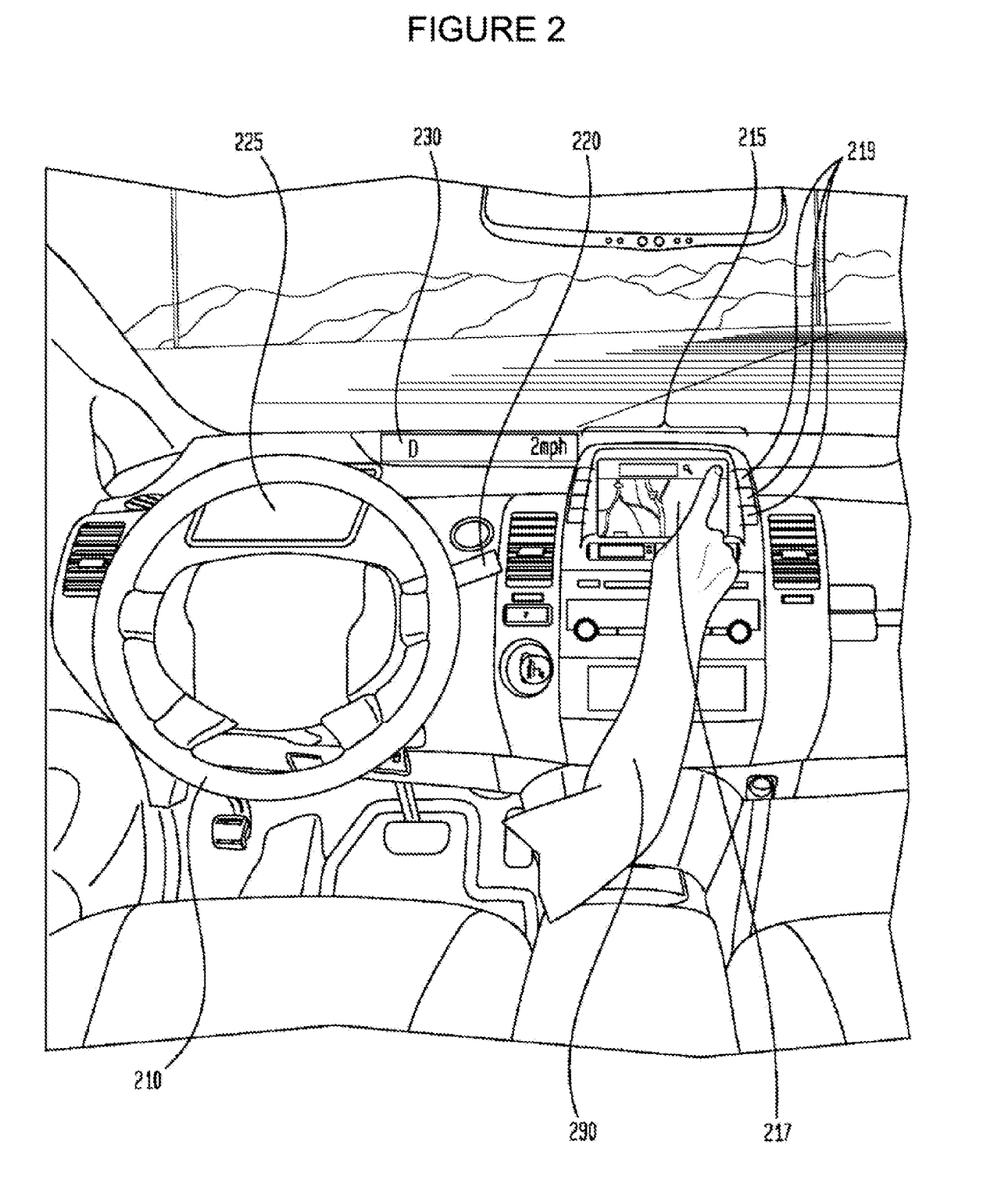
FIG. 2 is an exemplary design of the interior of an autonomous vehicle in accordance with an aspect of the disclosure.

FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220.

In the example of FIG. 2, vehicle 101 may be equipped with a display 225 for displaying information relating to the overall status of the vehicle, particular sensors, or computer 110 in particular. The display 225 may include computer generated images of the vehicle's surroundings including, for example, the status of the computer (cruise), the vehicle itself, roadways, intersections, as well as other objects and information.

Computer 110 may use visual or audible cues to indicate whether computer 110 is obtaining valid data from the various sensors, whether the computer is partially or completely controlling the direction or speed of the car or both, whether there are any errors, etc. Vehicle 101 may also include a status indicating apparatus, such as status bar 230, to indicate the current status of vehicle 101. For example, a status bar 230 may display "D" and "2 mph" indicating that the vehicle is presently in drive mode and is moving at 2 miles per hour. In that regard, the vehicle may display text on an electronic display, illuminate portions of vehicle 101, or provide various other types of indications. In addition, the computer may also have external indicators which indicate whether, at the moment, a human or an automated system is in control of the vehicle, that are readable by humans, other computers, or both.

Computer 110 may be an autonomous driving computing system capable of communicating with various components of the vehicle. As shown in FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be frilly or partially autonomous. It will be understood that although various systems and computer 110 are shown within vehicle 101, these elements may be external to vehicle 101 or physically separated by large distances.

Vehicle 101 may include a detection system 150 for detecting objects external to the vehicle, such as other vehicles, obstacles in the roadway, traffic signals, signs, trees, etc. The detection system 150 may include lasers, sonar, radar, cameras or any other detection devices. For example, if the vehicle is a small passenger car, the car may include a laser mounted on the roof or other convenient location. In one aspect, the laser may measure the distance between the vehicle and the object surfaces facing the vehicle by spinning on its axis and changing its pitch. The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects which are captured by 2 or more cameras. These sensors allow the vehicle to understand and potentially respond to its environment in order to maximize safety for passengers as well as objects or people in the environment.

Many of these sensors provide data that are processed by the computer 110 in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

Figure 3:
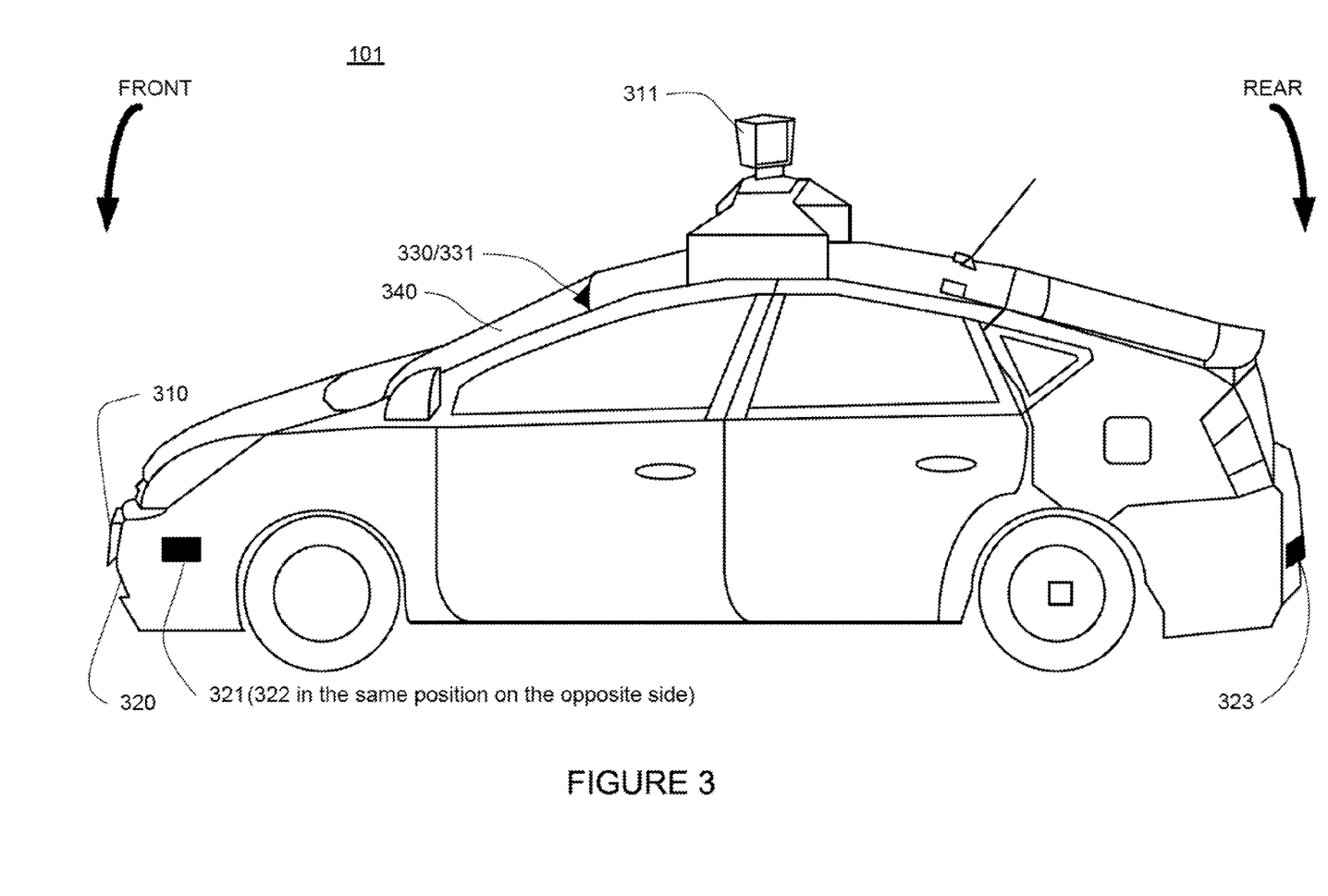
FIG. 3 is a view of the exterior of an exemplary vehicle in accordance with an aspect of the disclosure.

FIG. 3 illustrates a particular embodiment for a small passenger vehicle 301 that includes lasers 310 and 311, mounted on the front and top of the vehicle, respectively. Laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 301 includes radar detection units 320-323 located on the side (only one side being shown), front and rear of the vehicle. Each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 301 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

Figure 4A:
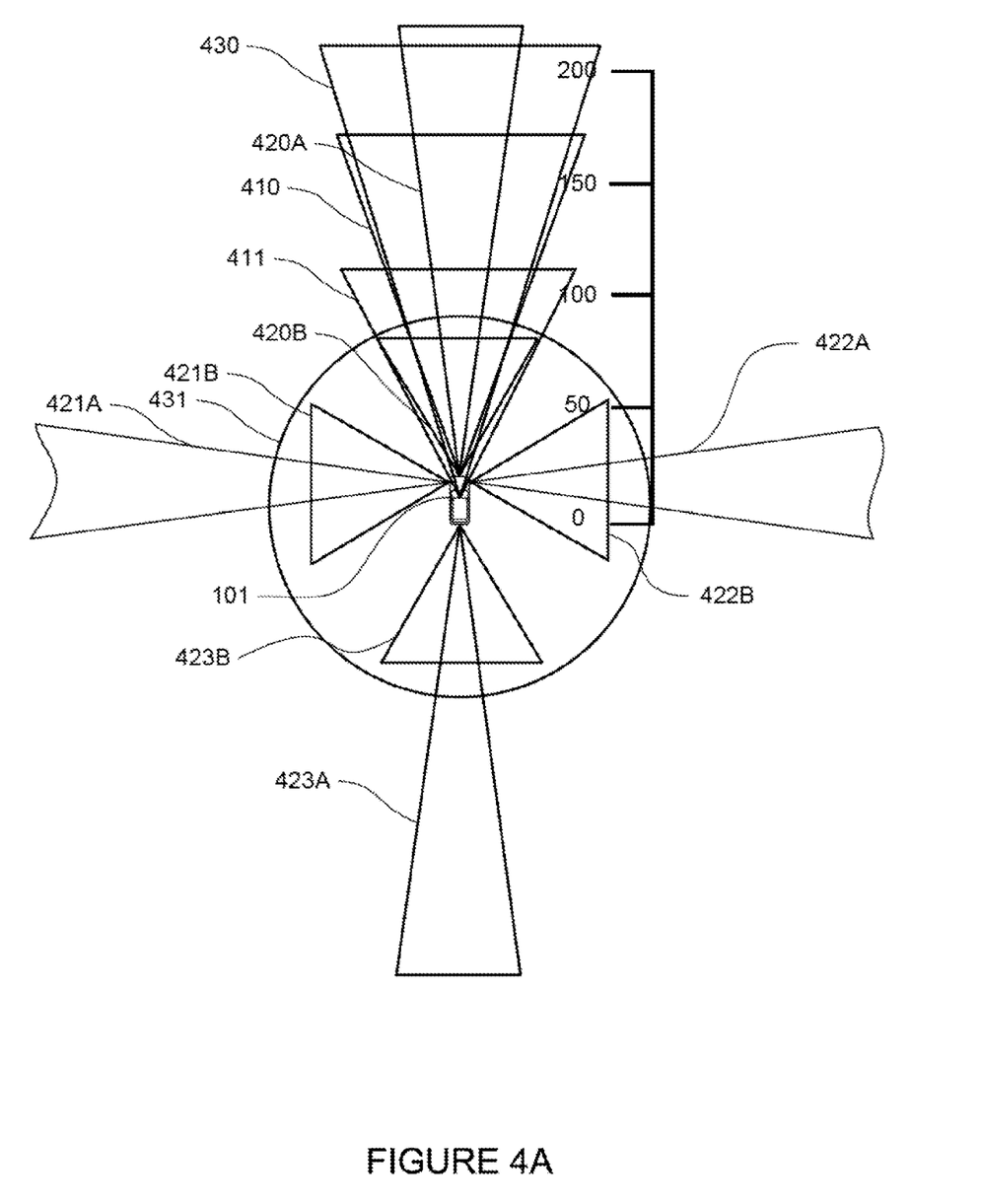
FIGS. 4A-4D are views of the sensor fields for an autonomous vehicle.
Figure 4B:
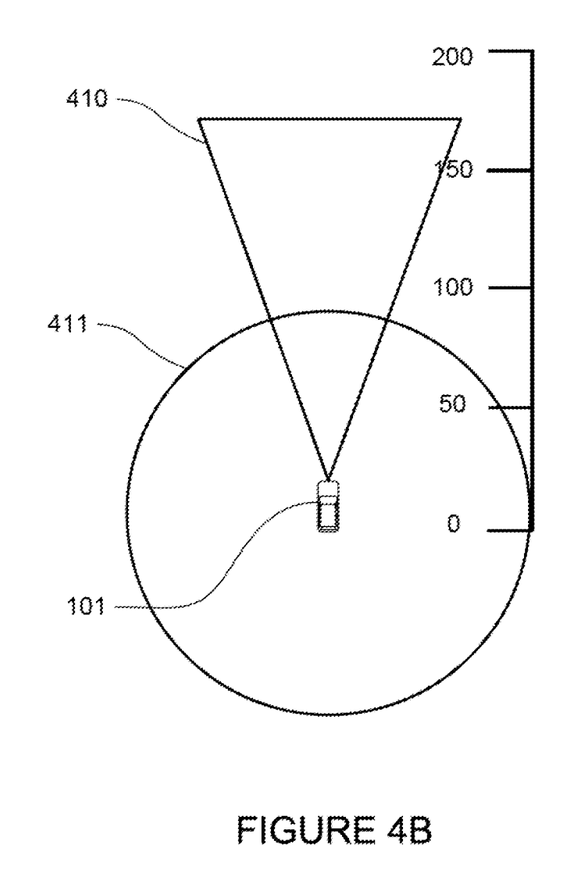

Each sensor may be associated with a particular sensor field in which the sensor may be used to detect objects. FIG. 4A is a top-down view of the approximate sensor fields of the various sensors. FIG. 4B depicts the approximate sensor fields 410 and 411 for lasers 310 and 311, respectively based on the fields of view for these sensors. For example, sensor field 410 includes an approximately 30 degree horizontal field of view for approximately 150 meters, and sensor field 411 includes a 360 degree horizontal field of view for approximately 80 meters.

Figure 4C:
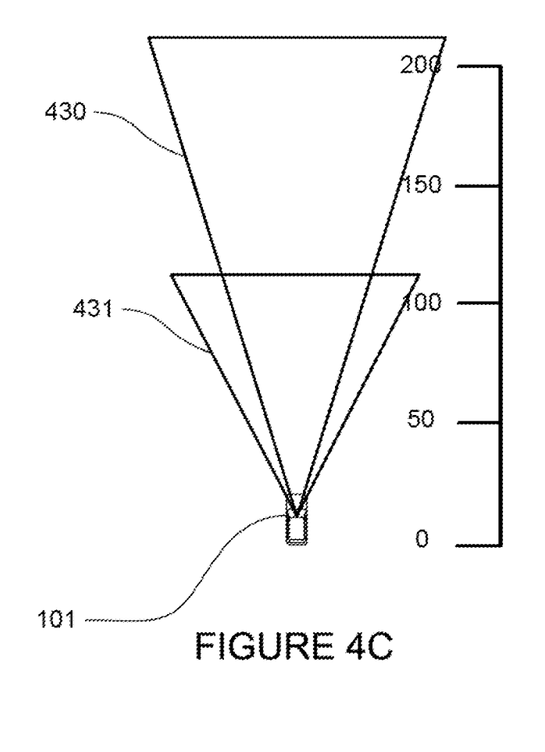
Figure 4D:
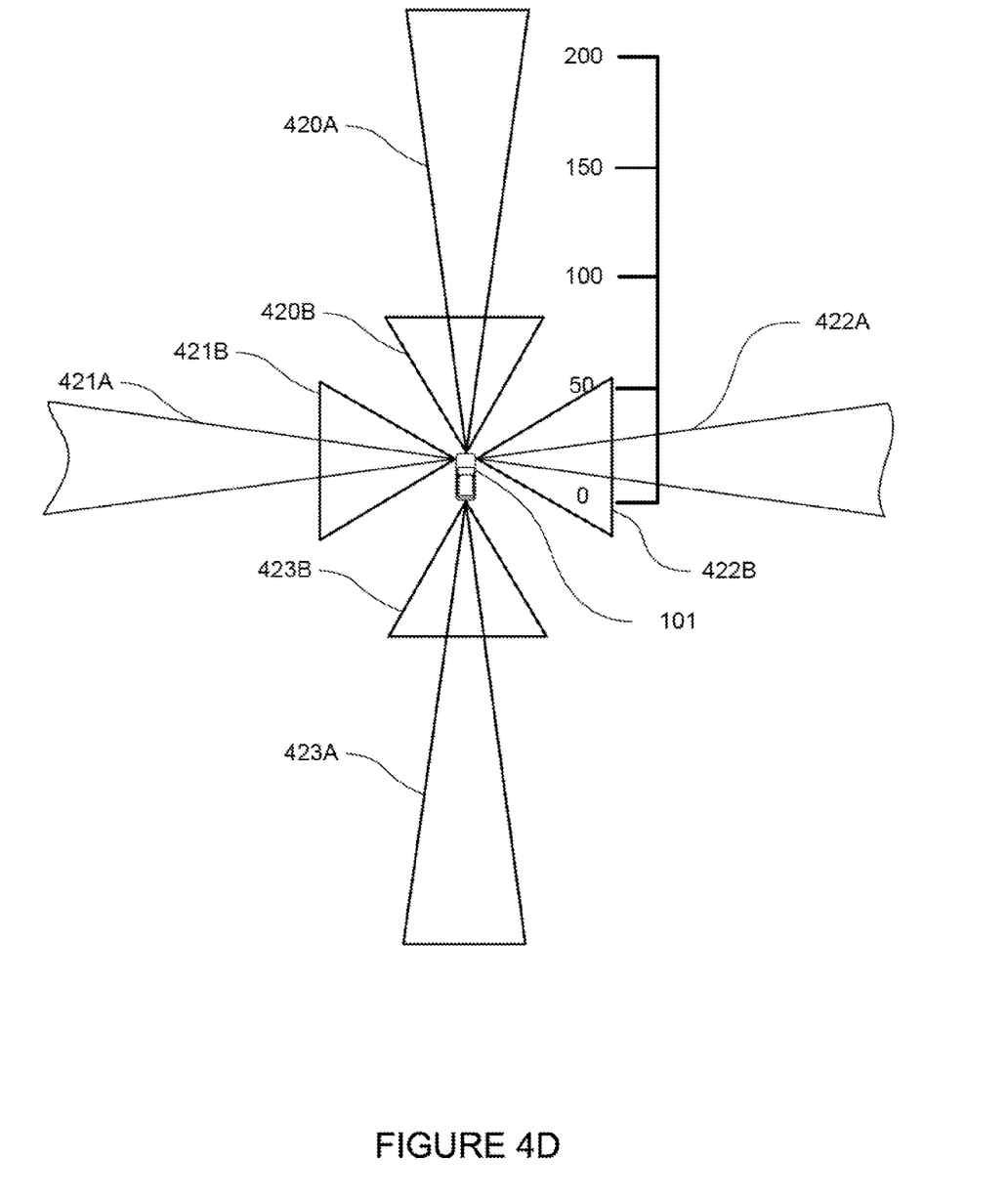

FIG. 4D depicts the approximate sensor fields 420A-423B and for radar detection units 320-323, respectively, based on the fields of view for these sensors. For example, radar detection unit 320 includes sensor fields 420A and 420B. Sensor field 420A includes an approximately 18 degree horizontal field of view for approximately 200 meters, and sensor field 420B includes an approximately 56 degree horizontal field of view for approximately 80 meters. Similarly, radar detection units 321-323 include sensor fields 421A-423A and 421B-423B. Sensor fields 421A-423A include an approximately 18 degree horizontal field of view for approximately 200 meters, and sensor fields 421B-423B include an approximately 56 degree horizontal field of view for approximately 80 meters. Sensor fields 421A and 422A extend passed the edge of FIGS. 4A and 4D.

FIG. 4C depicts the approximate sensor fields 430-431 cameras 330-331, respectively, based on the fields of view for these sensors. For example, sensor field 430 of camera 330 includes a field of view of approximately 30 degrees for approximately 200 meters, and sensor field 431 of camera 430 includes a field of view of approximately 60 degrees for approximately 100 meters.

In another example, an autonomous vehicle may include sonar devices, stereo cameras, a localization camera, a laser, and a radar detection unit each with different fields of view. The sonar may have a horizontal field of view of approximately 60 degrees for a maximum distance of approximately 6 meters. The stereo cameras may have an overlapping region with a horizontal field of view of approximately 50 degrees, a vertical field of view of approximately 10 degrees, and a maximum distance of approximately 30 meters. The localization camera may have a horizontal field of view of approximately 75 degrees, a vertical field of view of approximately 90 degrees and a maximum distance of approximately 10 meters. The laser may have a horizontal field of view of approximately 360 degrees, a vertical field of view of approximately 30 degrees, and a maximum distance of 100 meters. The radar may have a horizontal field of view of 60 degrees for the near beam, 30 degrees for the far beam, and a maximum distance of 200 meters.

The sensors described may be used to identify, track and predict the movements of pedestrians, bicycles, other vehicles, or objects in the roadway. For example, the sensors may provide the location and shape information of objects surrounding the vehicle to computer 110, which in turn may identify the object as another vehicle. The object's current movement may be also be determined by the sensor (e.g., the component is a self-contained speed radar detector) or by the computer 110 based on information provided by the sensors (e.g., by comparing changes in the object's position data over time).

The computer may change the vehicle's current path and speed based on the presence of detected objects. For example, the vehicle may automatically slow down if its current speed is 50 mph and it detects, by using its cameras and using optical-character recognition, that it will shortly pass a sign indicating that the speed limit is 35 mph. Yet further, if the computer determines that an object is obstructing the intended path of the vehicle, it may maneuver the vehicle around the obstruction.

Figure 5:
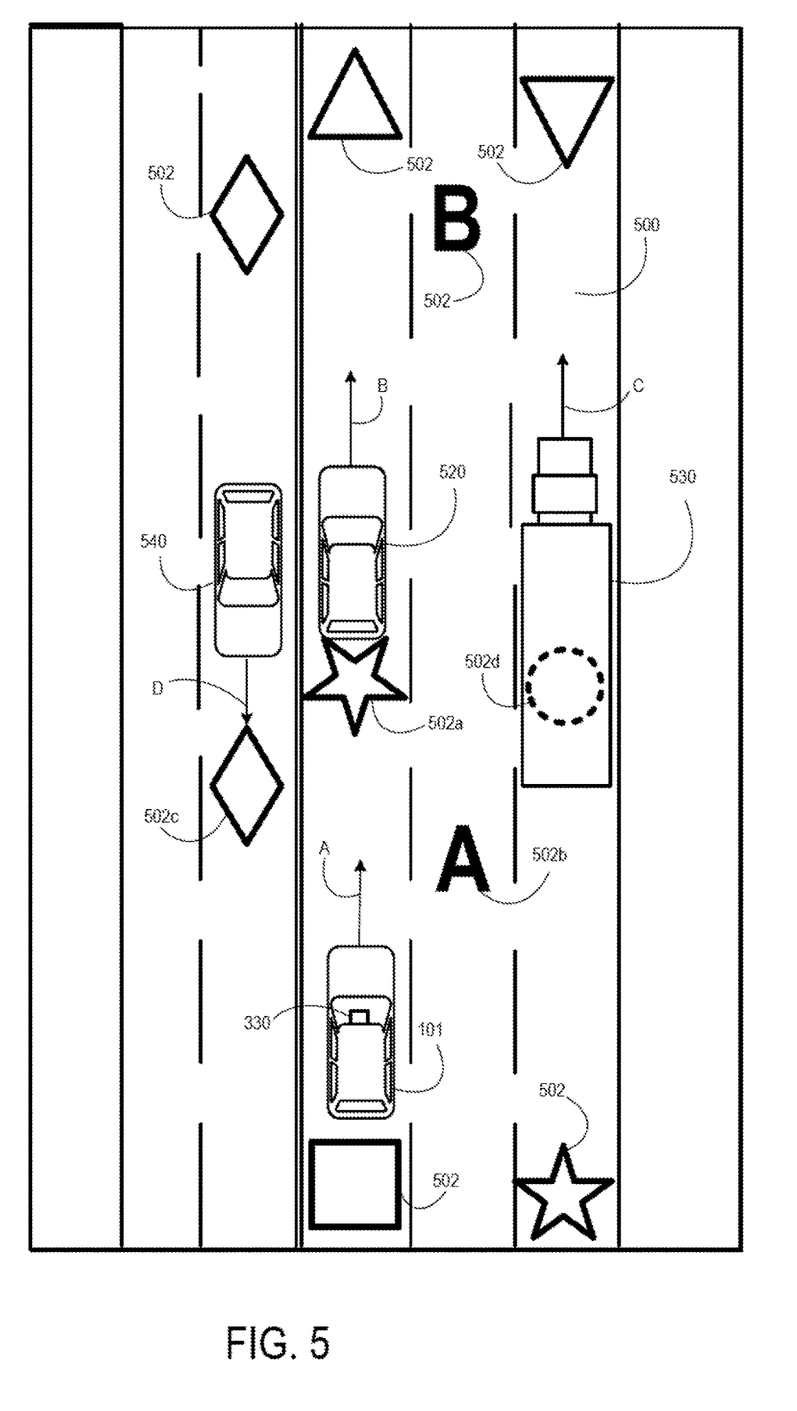
FIG. 5 is a view of an autonomous vehicle traveling autonomously in proximity to other vehicles.

In order to safely navigate amid surrounding objects, such as other vehicles and pedestrians, vehicle 101 will often need to accurately determine its distance from those objects. In accordance with one embodiment, vehicle 101 may use ground markers to more accurately determine the position of other vehicles or pedestrians. For example, as shown in FIG. 5, road 500 contains a plurality of ground markers 502. As vehicle 101 travels along in the direction of arrow A, vehicle 101 may use a camera that is part of detection system 150, such as camera 330, to detect and identify ground markers 502 that are within view of the camera. At vehicle 101's current position, at least ground markers 502a-c are within the line of sight of camera 330.

In addition to detecting ground markers 502, vehicle 101 may also detect and track surrounding vehicles 520, 530, and 540. As indicated by arrow B, vehicle 520 is traveling along the same lane as vehicle 101, and has just passed ground marker 502a. Prior to passing ground marker 502a, vehicle 520 would have obstructed camera 330's view of the ground marker. Thus, ground marker 502a did not enter camera 330's line of sight after vehicle 520 moved beyond ground marker 502a.

In accordance with one embodiment, vehicle 101 may determine that ground marker 502a has recently become visible to camera 330 and thereby determine the position of vehicle 520. As shown in FIG. 1, computer 110 contains map data 136 that includes ground marker locations, as well as camera data 138. The ground marker location data may include the exact geographic coordinates of the ground markers and may also include the ground markers' position relative to other objects or markers. Using instructions 132, computer 110 may access the ground marker location data 136 to determine the location of a specific ground marker. The location of the ground marker may access the camera data 138 to track surrounding vehicles and determine the visibility of particular ground marker. In particular, computer 110 may determine when a ground marker has become visible, or has ceased to be visible, to detection system 150.

For example, returning to FIG. 5, vehicle 101 may determine that ground marker 502a has recently become visible to camera 330. Based on the position and movements of vehicle 520, vehicle 101 may also determine that vehicle 520 is traveling in the lane in which ground marker 502a resides, and that the visibility of ground marker 502a is based on vehicle 520 passing that ground marker as it travels along road 500. Accordingly, vehicle 101 may determine that vehicle 520 is now located just past ground marker 502a. By accessing the road mark location data 136, vehicle 101 may then determine the current location of vehicle 520. The location of vehicle 520 may then be compared with the position data 137 for vehicle 101 so as to determine the distance of vehicle 520 from vehicle 101. Vehicle 101 may then take one or more actions based on its distance from vehicle 520. For example, vehicle 101 may accelerate, decelerate, or change lanes, depending on its distance from vehicle 520.

The method of using ground markers to determine an object actual and relative position may be used alone or in any combination with other position determination techniques. As stated above, vehicle 101 may have a detection system 150 that includes lasers, sonar, radar, and stereo cameras, which may also be used to determine vehicle 101's distance from surrounding objects. However, distance determinations for these various detection system devices will often be inexact. Thus, instructions 132 may combine the results of all distance determination techniques in order to produce a more accurate result. For example, computer 110 may take the average of the various distance determinations, or may compare the results of each detection system to determine if a cluster of distance determinations exists. Computer 110 may then exclude the results of any detection system that does not reside within the cluster of distance determinations. In addition, computer 110 may use images from a camera to determine when vehicle 101 has passed over particular ground makers, thereby allowing computer 110 to localize vehicle 101 based on the determined location of the ground marks.

Returning to FIG. 5, vehicle 101 may determine the position of vehicle 530 and 540 using ground markers 502d and 502c, respectively. Ground marker 502d is currently not visible to camera 330, in that vehicle 530 is directly over ground marker 502d as it travels along the right-hand lane in the direction of arrow C. Thus, vehicle 101 may determine that vehicle 530 is located just past ground marker 502d as soon as ground marker 502d becomes visible. Vehicle 101 may also use camera 330 to determine that vehicle 530 is traveling along the second lane from the left in the direction of arrow D. In addition, vehicle 101 may determine that vehicle 540 has not yet reached ground marker 502c. Computer 110 of vehicle 101 may then access the ground marker location data 134 for ground marker 502c, as well as the geographic position data 137 for vehicle 101, to determine its distance ground marker 502c. This determination puts a lower bound on how close vehicle 540 is to vehicle 101, in that vehicle 540 must be farther than ground marker 502c. Vehicle 101 may then exclude any distance determinations from other detection devices that provide a result indicating that vehicle 540 is closer than ground marker 502c. Once vehicle 540 passes over ground marker 502c, the ground marker will no longer be visible to camera 330. Thus, vehicle 101 may determine the moment that vehicle 540 has reached the position of ground marker 502c by determining when ground marker 502c is no longer visible. In turn, computer 110 may use this position determination to calculate vehicle 101's distance from vehicle 540.

Ground markers used in accordance with the disclosed methods may take any form, including but not limited to alphanumeric characters, symbols, or shapes. In addition, the ground markers may appear at any location along a road, either at regular or irregular intervals. Ground markers are preferably of a shape, size, and color so as to allow them to be easily detected by a vehicle mounted camera. In addition, the ground markers are preferably positioned along a road so that their visibility is at least partially obscured by vehicles that pass over them. This may be accomplished by placing the ground markers in the center of the road lanes.

As shown in FIG. 5, ground markers 502 may appear as alternating shapes and have differing orientations. In accordance with one embodiment, vehicle 101 may determine the shape or orientation of a detected ground marker 502 and may access ground marker location data 136 that identifies the shape or orientation of each marker, as well as its location. In this way, vehicle 101 may differentiate between two nearby ground markers based on the shape or orientation of the ground markers. In yet another alternative, the ground markers may be differentiated by varying the color or size of the ground markers. As stated above, vehicle 101 may use its current geographic position to determine which ground markers it is currently detecting. Therefore, the differentiation of ground markers by shape, color, size, orientation is particularly useful in instances where vehicle 101's determination of its position is unavailable or inexact, in that vehicle 101 may not be able to determine which ground marker it is currently detecting without the ability to differentiate between the various nearby ground markers.

While ground markers may be specifically placed along a road for the sole purpose of acting as ground markers. The disclosed system and method may also use current road markings as ground markers. For example, ground marker 502c in FIG. 5 represents a pre-existing road marking designating the lane as a High Occupancy Vehicle ("HOV") lane. Similarly, any marking that would be driven over by passing vehicles, such as pedestrian crossings, may be used as a ground marker, provided that the position for each marking is stored within database 136.

Figure 6:
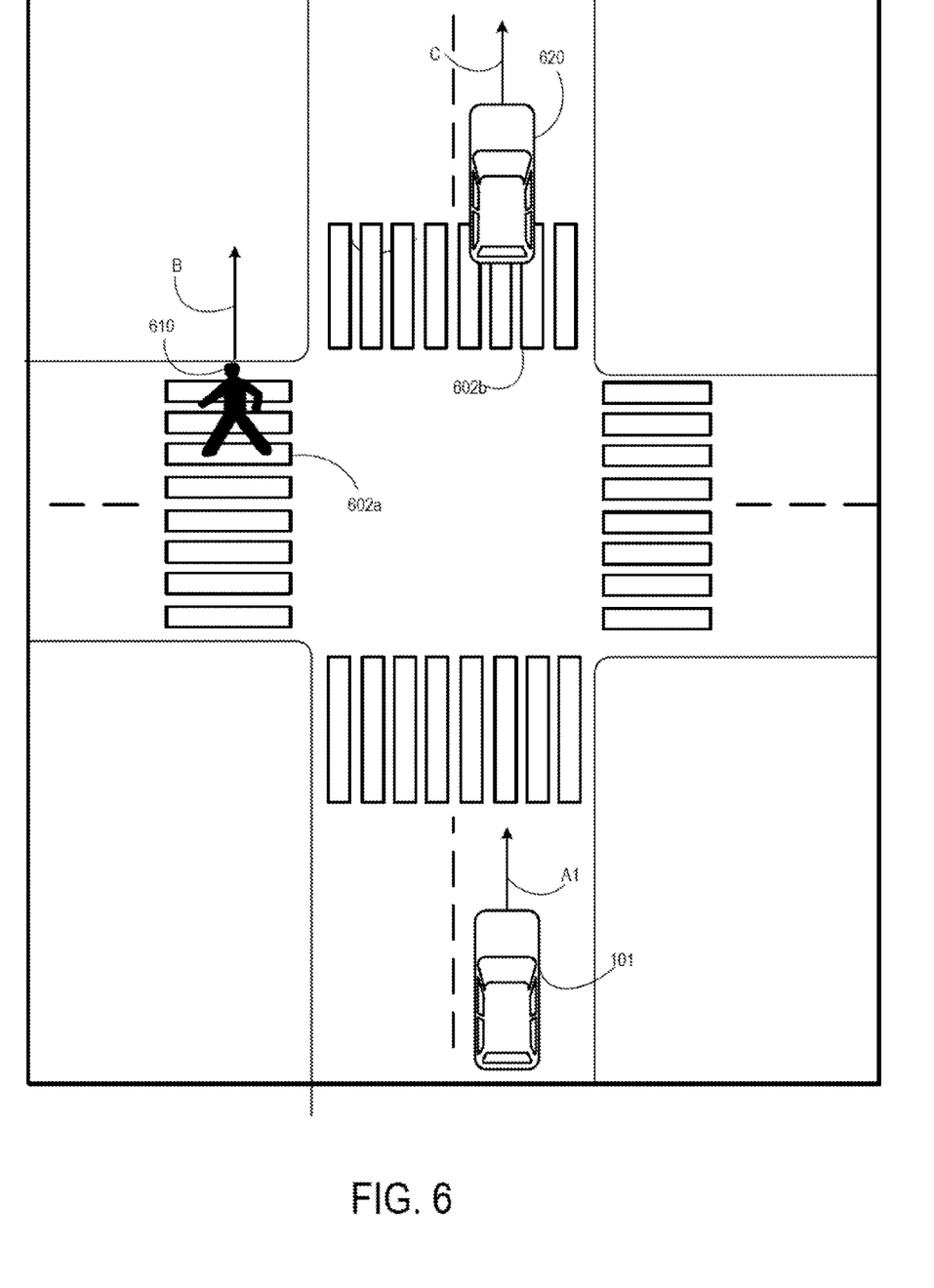
FIG. 6 is a view of an autonomous vehicle traveling autonomously in proximity to other vehicles and pedestrians.

In FIG. 6, autonomous vehicle 101 is traveling along path A. Using the sensors described above, autonomous vehicle 101 detects a group of pedestrians 610, vehicle 620, and ground markers 602. Pedestrians 610 travel in the direction of arrow B, vehicle 101 may determine that ground marker 602a has changed from being partially obscured by pedestrians 610 to being completely visible. Similarly, as vehicle 620 travels in the direction of arrow C, vehicle 101 may determine that ground marker 602b is no longer obscured by vehicle 620. Vehicle 101 may then access database 136, of FIG. 1, to determine the locations of ground markers 602a and 602b and thereby determine the location of pedestrians 610 and vehicle 620, respectively.

The collection of data for vehicle or pedestrian movements may be accomplished in any number of ways. Not only may vehicle 101 use its own cameras to determine the visibility of ground marks, it may also access images taken from roadside cameras or images acquired from other vehicles similar to vehicle 101.

Figure 7:
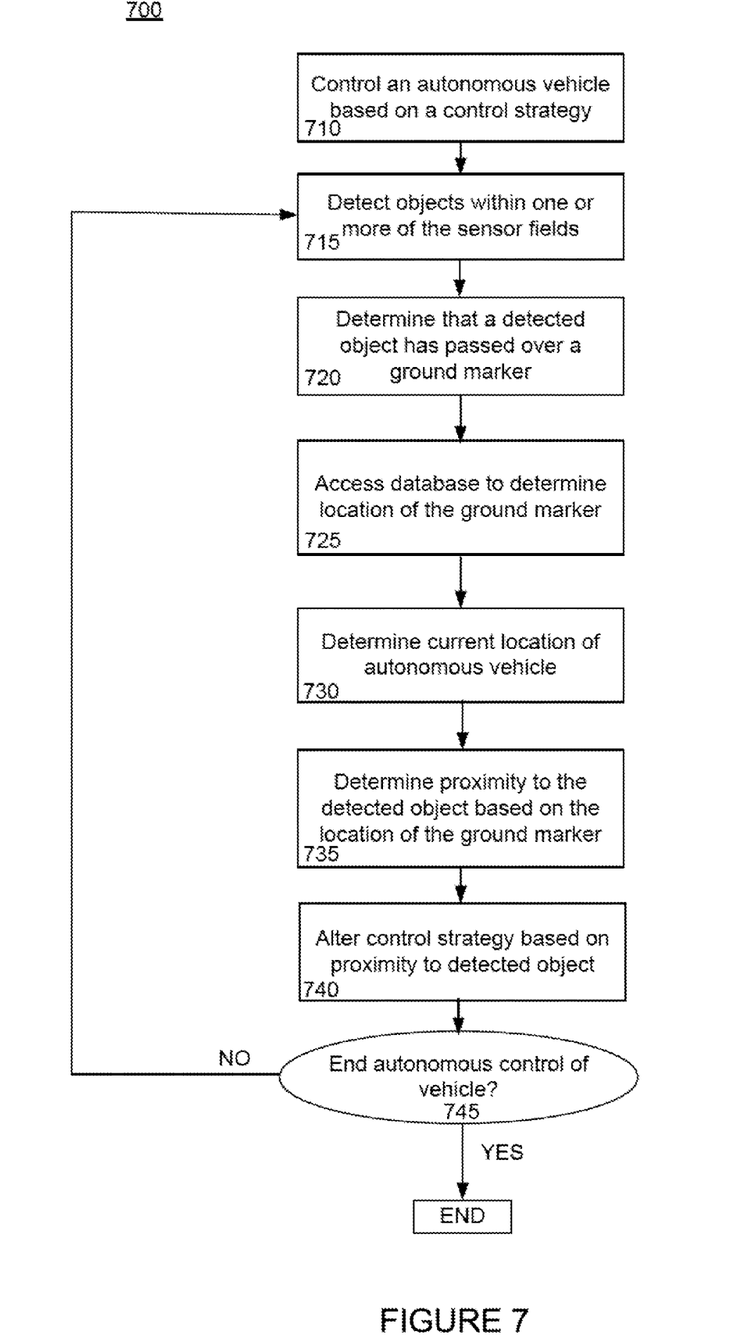
FIG. 7 is a flow chart in accordance with an aspect of the disclosure.

In addition, autonomous vehicle 101 may transport itself, passengers, and/or cargo between two locations by following a route. For example, a driver may input a destination and activate an autonomous mode of the vehicle. In response, the vehicle's computer 110 may calculate a route using a map, its current location, and the destination. Based on the route (or as part of the route generation), the vehicle may determine a control strategy for controlling the vehicle along the route to the destination. For example, the control strategy may include where to turn, at what speeds to travel, what lane to travel in, where to look for traffic signals, where to stop for intersections or stop signs, etc. Flow diagram 700 of FIG. 7 provides an example by which vehicle 101 may be autonomously controlled in response to another vehicle's position, as determined in accordance with an embodiment of the disclosed method. As provided in Block 710, vehicle 101 implements the determined control strategy by traveling to travel along the route. While traveling in accordance with the control strategy, vehicle 101 detects the presence of numerous objects within one or more of the vehicle's sensor fields (Block 715).

Upon detecting the objects, the vehicle's computer 110 may determine that one of the detected objects as passed over a ground marker (Block 720). As provided above, this determination can be made based on the ground marker becoming visible as the detected object travels over and past the ground marker. Alternatively, a detected object that is traveling toward the autonomous vehicle may be determined to have passed over a ground marker when the ground marker becomes obscured by the detected object. As provided in Block 725, computer 110 may access a database to determine the location of the ground marker that has been passed over by the detected object. As set forth above, the ground markers may vary as to their shape, color, size, or orientation. Computer 110 may determine the shape, color, size, or orientation of the detected ground marker, so as to associate the detected ground marker with one of the ground markers provided in the accessed database. Computer 110 may also determine the current location of the autonomous vehicle (Block 730). By comparing the autonomous vehicle's location with the location of the detected ground marker, computer 110 may determine the proximity of the autonomous vehicle with the detected object (Block 735).

Based on the position of the detected objects, computer 110 may implement a new or altered control strategy, such as by accelerating or decelerating (Block 740). As the autonomous vehicle travels along the desired route and remains under the control of the autonomous navigation system, computer 110 will repeat Block 715 through 740 for all objects detected along the route (Block 745).

By implementing aspects of flow diagram 700, vehicle 101 will be able to autonomously react to surrounding vehicles or pedestrians in a way that minimizes the risk of accidents or other unwanted events. While the operational blocks of FIG. 7 are provided in a particular order, autonomous vehicle 101 may add operations, remove operations, or switch the order of the operations in accordance with aspects of the method and system.

Vehicle 101 may include one or more user input devices that enable a user to provide information to the autonomous driving computer 110. For example, a user, such as passenger 290, may input a destination (e.g., 123 Oak Street) into the navigation system using touch screen 217 or button inputs 219. In another example, a user may input a destination by identifying the destination. In that regard, the computer system may extract the destination from a user's spoken command (e.g., by stating or inputting "De young museum" as in the example of FIGS. 2 and 3).

The various systems described above may be used by the computer to operate the vehicle and maneuver from one location to another. For example, a user may enter destination information into the navigation, either manually or audibly. The vehicle may determine its location to a few inches based on a combination of the GPS receiver data, the sensor data, as well as the detailed map information. In response, the navigation system may generate a route between the present location of the vehicle and the destination.

When the driver is ready to relinquish some level of control to the autonomous driving computer, the user may arm the computer. The computer may be armed, for example, by pressing a button or by manipulating a lever such as gear shifter 220. Rather than taking control immediately, the computer may scan the surroundings and determine whether there are any obstacles or objects in the immediate vicinity which may prohibit or reduce the ability of the vehicle to avoid a collision. In this regard, the computer may require that the driver continue controlling the vehicle manually or with some level of control (such as the steering or acceleration) before entering into a fully autonomous mode.

Once the vehicle is able to maneuver safely without the assistance of the driver, the vehicle may become fully autonomous and continue to the destination. It will be understood that the driver may continue to assist the vehicle by controlling, for example, steering or whether the vehicle changes lanes, or the driver may take control of the vehicle immediately in the event of an emergency.

The vehicle may continuously use the sensor data to identify objects, such as traffic signals, people, other vehicles, and other objects, in order to maneuver the vehicle to the destination and reduce the likelihood of a collision. The vehicle may use the map data to determine where traffic signals or other objects should appear and take actions, for example, by signaling turns or changing lanes. Once the vehicle has arrived at the destination, the vehicle may provide audible or visual cues to the driver. For example, by displaying "You have arrived" on one or more of the electronic displays.

In one aspect, the features described above may be used in combination with larger vehicles such as trucks, tractor trailers, or passenger busses. For such vehicles, the system may consider additional information when computing how to control the vehicle safely. For example, the physical attributes of a tractor trailer, such as its articulation and changing weight, may cause it to maneuver very differently than smaller passenger cars. Larger vehicles may require wider turns or different levels of acceleration and braking in order to avoid collisions and maneuver safely. The computer may consider the geometry of the vehicle when calculating and executing maneuvers such as lane changes or evasive actions.

The vehicle may be only partially autonomous. For example, the driver may select to control one or more of the following: steering, acceleration, braking, and emergency braking.

Figure 8:
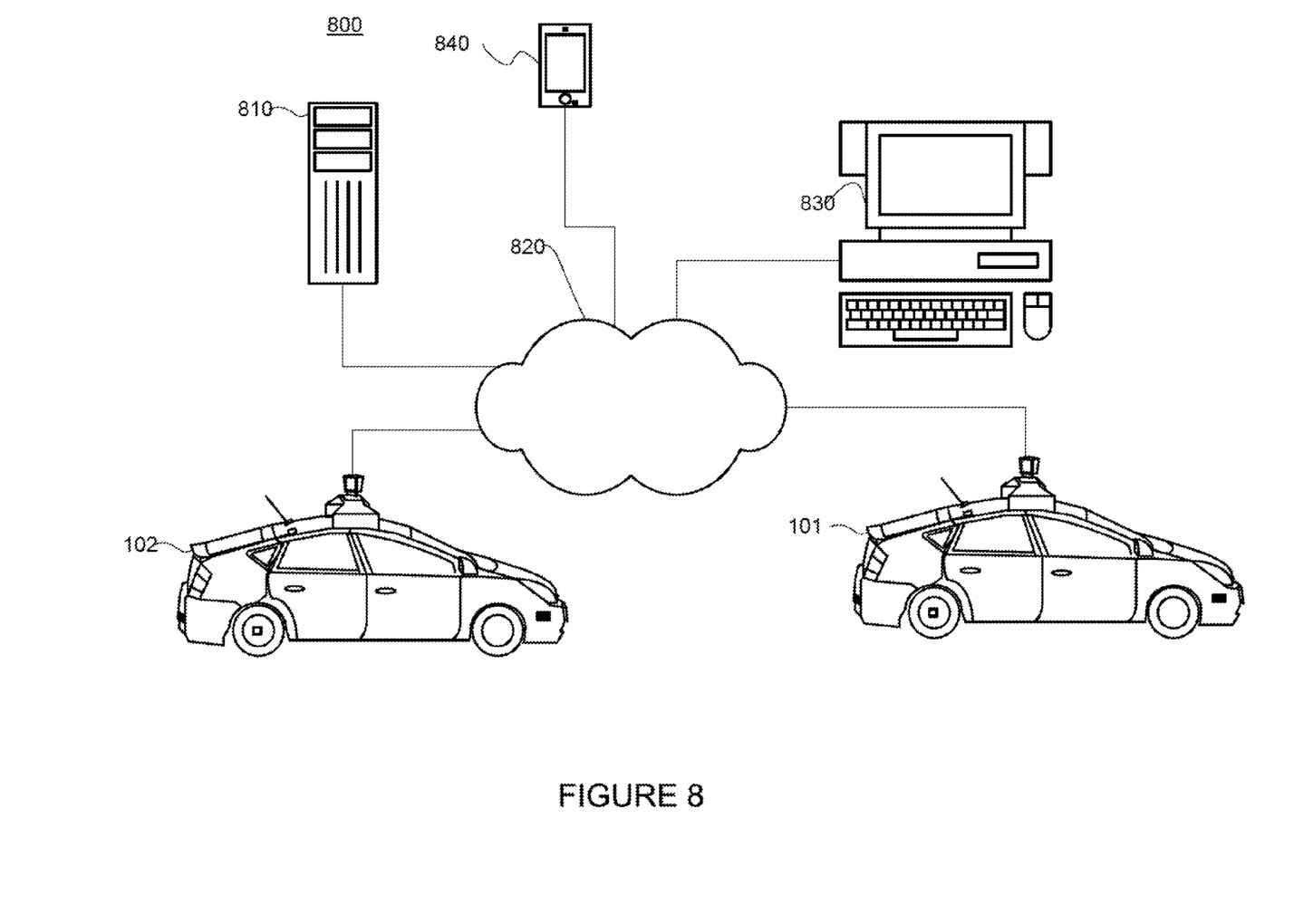
FIG. 8 is a functional diagram of a communication system in accordance with an aspect of the disclosure.

The driver may also select to have his or her vehicle communicate with other devices. As shown in FIG. 8, vehicle 101 may communicate over a network 820 with devices such as a remote server 810, a personal computer 730, a mobile device 740, or another autonomous vehicle 802. In addition, vehicles, such as vehicle 101 and vehicle 102, may wirelessly transmit information directly to nearby vehicles using radio, cellular, optical or other wireless signals. Alternatively, vehicles may communicate with each via nodes that are shared among multiple vehicles, e.g., by using cell towers to call other cars or transmit and send information to other cars via the Internet. The transmitted information between vehicles may include, for example, data describing the vehicle or the vehicle's environment, including data regarding ground markers and the position of nearby vehicles.

In one example, a driver of a first vehicle may select an option to allow other vehicles on the roadway to transmit information from the vehicle's sensors or computer. This information may include details about the first vehicle's environment such as detected objects, traffic conditions, or construction. The information transmitted to other vehicles may be sensor data unprocessed by the first computer or information previously processed by the first computer in order to reduce the time needed to obtain and process the information at a second vehicle. If the second autonomous vehicle is behind the first vehicle, it may use the information to determine how to maneuver the vehicle. By way of example, if the first vehicle is only a few car lengths in front of the second vehicle and it detects a moving object, the first vehicle may transmit information relating to the moving object to the second vehicle. If the second vehicle determines that the object is moving towards the second vehicle's path, the second vehicle may slow down. Yet further, if the second vehicle is a few miles behind the first vehicle and the first vehicle determines that it is in a traffic jam (e.g., by determining that its speed is substantially less than the road's speed limit), the second vehicle may select an alternate route.

Vehicle 101 may also receive updated map, including ground marker data, via network 820. For example, server 810 may provide vehicle 101 with new data relating to the location and appearance of ground markers. Computer system 110, of FIG. 1, may then be updated, and the new data may be used in controlling the vehicle autonomously, such as through implementation of flow diagram 700.

Autonomous vehicles may also be controlled remotely. For example, if the driver is asleep, the sensor data may be sent to a third party so that vehicle may continue to have a responsive operator. While delay and latency may make this type of telemetry driving difficult, it may for example be used in emergency situations or where the vehicle has gotten itself stuck. The vehicle may send data and images to a central office and allow a third party to remotely drive the vehicle for a short period until the emergency has passed or the vehicle is no longer stuck.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method, comprising:
   detecting, using a camera a set of ground markers positioned on a surface of a roadway so that each given ground marker of the set of ground markers is in a position that allows an object to at least partially obscure the given ground marker when the object traverses over the given ground marker on the surface of the roadway;
   for each detected ground marker of the set of ground markers, recording, using one or more processors, the position of the detected ground marker; and
   using the recorded position of the detected ground marker to update a database of ground marker positions that identifies positions and appearances of ground markers to allow a vehicle having the updated database to detect the proximity of another object to the vehicle based on the another object passing over one of the ground markers of the set of ground markers.

2. The method of claim 1, wherein the position of each given ground marker corresponds to a center region of a lane of the roadway.

3. The method of claim 1, wherein the set of ground markers are positioned at regular intervals.

4. The method of claim 1, wherein the set of ground markers are positioned at irregular intervals.

5. The method of claim 1, wherein at least two of the ground markers of the set of ground markers have different shape and are detected directly adjacent to one another on the surface of the roadway, and the updated database of ground marker positions further identifies a shape of each ground marker of the set of ground markers.

6. The method of claim 1, wherein at least two ground markers are detected directly adjacent to one another on the surface of the roadway at different orientations, and the updated database of ground marker positions further identifies an orientation of each ground marker of the set of ground markers.

7. The method of claim 1, wherein the position of the given ground marker allows the ground marker to be visible to the camera mounted on the vehicle as the vehicle moves along the roadway and approaches the ground marker.

8. The method of claim 1, further comprising providing the updated database of ground marker positions to a vehicle having an autonomous driving mode.

9. A system comprising:
   a set of ground markers positioned on a surface of a roadway so that each given ground marker of the set of ground markers is in a position that allows an object to at least partially obscure the given ground marker when the object traverses over the ground marker on the surface of the roadway;
   a camera configured to detect the set of ground markers;
   a memory configured to store positions of the detected set of ground markers; and
   a processor in communication with the camera and the memory, the processor being operable to update a database of ground marker positions that identifies positions and appearances of ground markers to allow a vehicle having the updated database to detect the proximity of another object to the vehicle based on the another object passing over one of the ground markers of the set of ground markers.

10. The system of claim 9, wherein the position of each given ground marker corresponds to a center region of a lane of the roadway.

11. The system of claim 9, wherein the set of ground markers is positioned at regular intervals.

12. The system of claim 9, wherein the set of ground markers are positioned at irregular intervals.

13. The system of claim 9, wherein at least two of the ground markers of the set of ground markers have different shapes, and the at least two of the ground markers are placed directly adjacent to one another on the surface of the roadway, and the database of ground marker positions further identifies a shape of each ground marker of the set of ground markers.

14. The system of claim 9, wherein at least two ground markers are positioned directly adjacent to one another on the surface of the roadway at different orientations, and the database of ground marker positions further identifies an orientation of each ground marker of the set of ground markers.

15. The system of claim 9, wherein the position of the given ground marker allows the ground marker to be visible to the camera mounted on the vehicle as the vehicle moves along the roadway and approaches the ground marker.

16. The system of claim 9, further comprising providing the updated database of ground marker positions to a vehicle having an autonomous driving mode.

17. A non-transitory recording medium on which instructions are stored, the instructions, when executed by one or more processors, cause the one or more processors to perform a method, the method comprising:
   recording positions of a set of ground markers on a surface of a roadway, where the position of each given ground marker of the set of ground markers allows an object to at least partially obscure the given ground marker when the object traverses over the given ground marker on the surface of the roadway;
   using the recorded position of the placed ground marker to update a database of ground marker positions that identifies positions and appearances of ground markers; and
   providing the updated database of ground marker positions to a vehicle having an autonomous driving mode to allow the vehicle to detect the proximity of another object to the vehicle based on the another object passing over one of the ground markers of the set of ground markers.

18. The medium of claim 17, wherein at least two of the ground markers of the set of ground markers have different shapes, and the at least two of the ground markers have positions that are directly adjacent to one another on the surface of the roadway, and the database of ground marker positions further identifies a shape of each ground marker of the set of ground markers.

19. The medium of claim 17, wherein at least two ground markers have positions that are directly adjacent to one another on the surface of the roadway at different orientations, and the database of ground marker positions further identifies an orientation of each ground marker of the set of ground markers.

20. The medium of claim 17, wherein the position of each given ground marker corresponds to a center region of a lane of the roadway.

* * * * *